(12) United States Patent
Ammerlaan

(10) Patent No.: US 12,550,837 B2
(45) Date of Patent: Feb. 17, 2026

(54) SUPPORT ASSEMBLY AND METHOD FOR GROWING PLANTS THEREIN

(71) Applicant: GREENROAD B.V., Enkhuizen (NL)

(72) Inventor: Arnoldus Cornelis Josef Ammerlaan, Enkhuizen (NL)

(73) Assignee: GREENROAD B.V., Enkhuizen (NL)

( * ) Notice: Subject to any disclaimer, the term of this patent is extended or adjusted under 35 U.S.C. 154(b) by 72 days.

(21) Appl. No.: 18/556,699

(22) PCT Filed: Apr. 22, 2022

(86) PCT No.: PCT/NL2022/050219
§ 371 (c)(1),
(2) Date: Oct. 23, 2023

(87) PCT Pub. No.: WO2022/225397
PCT Pub. Date: Oct. 27, 2022

(65) Prior Publication Data
US 2024/0206412 A1    Jun. 27, 2024

(30) Foreign Application Priority Data
Apr. 23, 2021 (NL) .................................... 2028056

(51) Int. Cl.
*A01G 17/06* (2006.01)
(52) U.S. Cl.
CPC .................................. *A01G 17/06* (2013.01)
(58) Field of Classification Search
CPC .................................. A01G 17/06; A01G 9/12
(Continued)

(56) References Cited

U.S. PATENT DOCUMENTS

| 679,124 | A | * | 7/1901 | von der Kammer | .. A01G 31/02 47/61 |
| 1,146,891 | A | * | 7/1915 | Maas | ....................... A01G 9/12 47/45 |

(Continued)

FOREIGN PATENT DOCUMENTS

| CN | 112106565 A | 12/2020 |
| CN | 112385433 A | 2/2021 |

(Continued)

*Primary Examiner* — Timothy D Collins
*Assistant Examiner* — Maria E Graber
(74) *Attorney, Agent, or Firm* — FISHERBROYLES, LLP; Roger L. Browdy

(57) ABSTRACT

Disclosed is a support assembly for supporting a plurality of layers of essentially horizontally extending meshed support elements, arranged one above the other with a distance therebetween, the support elements being designed to hold units of nutrient substrate spaced from one another, wherein in each unit of nutrient substrate an essentially horizontally growing plant is rooted, in order to allow the essentially horizontally growing plants to grow, supported by the respective meshed support element concerned, wherein the mesh size is such that the fruit forming from the horizontally growing plants can grow downwards through the mesh to ripen under the respective support element, wherein the distance between two support elements arranged one above the other is chosen so as to allow both unhindered horizontal growth of the plants on the lower support element and the development and ripening of the fruit of the plants growing on the upper element, and wherein a plurality of the support elements can be moved horizontally relative to one another to provide space for harvesting the fruit.

14 Claims, 7 Drawing Sheets

(58) Field of Classification Search
USPC .......................................................... 47/59 R
See application file for complete search history.

(56) References Cited

U.S. PATENT DOCUMENTS

| | | | | |
|---|---|---|---|---|
| 3,731,429 | A * | 5/1973 | Orthman | A01G 9/12 248/223.31 |
| 3,973,355 | A * | 8/1976 | McKenzie | A01G 24/28 521/905 |
| 8,267,261 | B2 * | 9/2012 | Vanderhoek | A47F 5/0081 211/187 |
| 10,517,232 | B2 * | 12/2019 | Sowinski | A01G 17/06 |
| 10,757,869 | B1 * | 9/2020 | Yost | A01G 9/26 |
| 10,939,623 | B2 * | 3/2021 | Miyahara | A01G 9/20 |
| 11,178,825 | B2 * | 11/2021 | Ahl | A01G 9/12 |
| 11,277,977 | B2 * | 3/2022 | Wardlaw | A01G 9/12 |
| 11,304,385 | B1 * | 4/2022 | Buss | A01G 9/12 |
| 11,889,798 | B2 * | 2/2024 | Eddins | F21S 4/28 |
| 11,925,154 | B1 * | 3/2024 | Tinsley | A01G 31/06 |
| 2008/0216404 | A1 * | 9/2008 | Jarvis | A01G 2/10 47/59 R |
| 2010/0107489 | A1 * | 5/2010 | Silver | A01G 9/249 47/58.1 R |
| 2011/0197502 | A1 * | 8/2011 | Morris | A01G 9/12 47/39 |
| 2011/0197505 | A1 * | 8/2011 | Hansen | A01G 9/12 47/46 |
| 2012/0227318 | A1 * | 9/2012 | Harger | A01G 9/12 47/46 |
| 2013/0160362 | A1 * | 6/2013 | Daas | A01G 9/1423 47/62 N |
| 2014/0196365 | A1 * | 7/2014 | Washington | A01G 9/124 47/65.5 |
| 2014/0305040 | A1 * | 10/2014 | Hall | A01G 9/1423 47/65.5 |
| 2015/0068121 | A1 * | 3/2015 | Probst | A01G 31/06 47/59 R |
| 2016/0135385 | A1 | 5/2016 | Wang | |
| 2016/0249536 | A1 | 9/2016 | Mermelstein | |
| 2016/0286733 | A1 * | 10/2016 | Fair | A01G 7/045 |
| 2017/0325415 | A1 * | 11/2017 | MacDonald | A01G 9/12 |
| 2017/0325416 | A1 * | 11/2017 | MacDonald | A01G 17/06 |
| 2018/0027753 | A1 * | 2/2018 | Major | A01G 9/12 |
| 2018/0054976 | A1 * | 3/2018 | Uy | A01G 13/10 |
| 2019/0037779 | A1 * | 2/2019 | Chirco | A01G 9/02 |
| 2020/0015431 | A1 * | 1/2020 | Kirk | B62B 5/0083 |
| 2020/0205352 | A1 * | 7/2020 | Riggs | A01G 9/02 |
| 2020/0329644 | A1 | 10/2020 | Wardlaw | |
| 2020/0337250 | A1 * | 10/2020 | Glover | A01G 22/00 |
| 2021/0392823 | A1 * | 12/2021 | Fortenbacher | A01G 9/24 |
| 2023/0172120 | A1 * | 6/2023 | Mitchell | A01G 9/12 47/45 |
| 2024/0130298 | A1 * | 4/2024 | Levy, Jr. | A01G 9/12 |

FOREIGN PATENT DOCUMENTS

| | | |
|---|---|---|
| JP | 04169136 A | 6/1992 |
| KR | 20190010779 A | 1/2019 |

* cited by examiner

SUPPORT ASSEMBLY AND METHOD FOR GROWING PLANTS THEREIN

The invention relates to a support assembly for essentially horizontally growing plants. The stems of such plants grow mainly horizontally over the ground. The leaves of such plants will face the light, i.e. upwards. However, the fruits of these plants hang down due to gravity and are often hidden under the foliage, which makes harvesting difficult. Moreover, the fruits often lie on the ground and are therefore an readily sensitive for pests and eating. Another disadvantage of regular growing of such plants is that the harvest depends on the available horizontal surface. Namely, these plants hardly grow in height, if at all.

The term essentially horizontally growing plants' refers to plants whose stems grow more horizontally than vertically. The stems may therefore also have a vertical growth component. The horizontal growth component may also be determined by the weight of the fruit, as the stems may be pulled downwards by the weight of the fruit, thus increasing the horizontal component of the growth direction. Such predominantly horizontally growing plants can also be branching plants with multiple stems. The leaves of the plant can grow upwards, but because of the horizontal growth of the plant, the growth height will remain limited.

The invention is directed to eliminating or alleviating the above-mentioned problems, and to this end it provides a support assembly for supporting a plurality of layers of essentially horizontally extending meshed support elements, arranged one above the other with a distance therebetween, the support elements being designed to hold units of nutrient substrate spaced from one another, wherein in each unit of nutrient substrate an essentially horizontally growing plant is rooted, in order to allow the essentially horizontally growing plants to grow, supported by the respective meshed support element, wherein the mesh size is such that the fruit forming from the essentially horizontally growing plants can grow downwards through the meshes to ripen under the respective meshed support element, wherein the distance between two meshed support elements arranged one above the other is chosen so as to allow both unhindered horizontal growth of the essentially horizontally growing plants on the lower support element and the development and ripening of the fruit of the essentially horizontally growing plants growing on the meshed upper element, and wherein a plurality of the meshed support elements can be moved horizontally relative to one another to provide space for harvesting the fruit.

By providing meshed support elements placed one above the other, the essentially horizontally growing plants can grow unhindered over the support element, and by placing units of nutrient substrates that are just enough for the plant to be rooted, plenty of space is provided for the fruit to develop under the leaves, and by growing through the meshes, the fruit will eventually hang down under the meshes. The leaves can grow upwards unhindered, while the fruit hangs downwards unhindered. These fruits hang in a space which is bounded above by the meshed support element on which the respective plant grows, and which is bounded below by another support element on which another substantially horizontally growing plant grows. In this way, multilayer growth of such plants is possible and a multiple yield of fruit can be obtained, while the fruit has more space than if it were growing under natural conditions. A plurality of meshed support elements are movable relative to each other, so that the space between two meshed supporting elements located one above the other can be temporarily enlarged or made accessible in order to have better access to the fruit or to the plant located below for harvesting and care, for example for fixing stems to the meshed supporting element.

Devices for multilayer growth of plants are known per se. For example, KR2019/0010779 describes a rack with several support elements extending horizontally with a vertical distance from one another, wherein the support elements are not meshed and are not suitable for plants essentially growing horizontally, with fruits thereof growing and ripening under the support element.

JP H04-169136A describes a tunnel-shaped mesh frame on which pumpkins can grow.

US2016/0249536 describes a container for growing a single plant, which container can have a horizontally arranged mesh for guiding vertically growing plants from below through separate openings of the mesh wherein growing buds are guided through a different mesh opening each time.

From US2016/0135385, a device for growing a fruit-bearing plant is known, in which the fruit rests on top of a mesh, while the roots of the plant are held in a nutrient medium located under the mesh.

From CN112106565, a device is known which comprises a number of horizontal trays in which a nutrient substrate for plants can be included, which trays are adjustable in height relative to one another.

The support assembly preferably comprises a common frame that carries the meshed support elements, which frame allows movement of at least some of the meshed support elements relative to one another. Thus, it is possible to provide, for example, a block-shaped frame with horizontal guides along which at least some of the meshed supporting elements can be slid horizontally. A number of supporting elements may also be fixed to the frame to provide rigidity for the frame. When the meshed supporting element there above or thereunder can be slid, there is also sufficient space to reach at the fixed supporting element. Preferably, the majority of the supporting elements, and even more preferably, all of the meshed supporting elements are horizontally movable. It is also possible to movably position the supporting elements vertically relative to each other so as to create space for harvesting or maintenance. A paternoster arrangement can be considered here, whereby the distance between two supporting elements can be temporarily increased. In order to make optimal use of the horizontal space, the support elements are preferably movable horizontally in relation to each other. For example, the frame may be provided with horizontal guides (1A in FIG. 6C) so that the supporting elements can be slid in and out of the frame like a drawer, as shown in FIG. 6C. The device may also be designed such that the support elements can rotate horizontally relative to one another to provide space required for harvesting, maintenance or care of the crop.

In an attractive embodiment, one or more meshed support elements are tiltable, preferably horizontally. For example, the guides of the frame may be provided with one or more hinges so that the support element can hinge relative to the frame or to the horizontal. In this way, the support element is placed in an inclined position which facilitates harvesting. The support assembly may be designed such, that the one or more meshed supporting elements can pivot when slid out of the frame. It is also possible to design the support assembly in such a way that the meshed support elements can hinge while they are still above each other, for example in the frame, or outside it, when the respective support elements have been slid out of the frame. The support elements can then be tilted, i.e. placed in an inclined position, simultaneously or independently of each other.

The distance between the meshed support elements is preferably adjustable. This adjustability may be achieved manually or mechanically. For example, the assembly may comprise multiple guides spaced vertically from one another and extending essentially horizontally, whereby the user may select which guide or guides will carry the support elements. In this way, it is possible to adjust the distance between the support elements according to the crop to be grown thereon or according to the stage of development of the crop. For example, when the fruit is not yet formed or is still small, the support elements can be kept at a shorter distance from one another than when the fruit is larger and needs more space.

The distance between two meshed support elements located above one another is chosen to be sufficient both for unhindered horizontal growth of the plants on the lower support element and for the development and ripening of the fruit of the plants growing on the upper element. The skilled person will know what distance to choose, depending on the crop. For a crop with large fruits, the distance will be greater than for a crop with small fruits. A larger distance can also be chosen for a crop that needs more light. The distance between the plants of two support elements lying above one another should preferably be 30-70 cm, more preferably 40-50 cm. This is the free space between the hanging fruits of the plants growing on the upper support element and the foliage of the plants growing on the lower support element.

The vertical distance between the meshed support elements is preferably 20-100 cm, more preferably 30-80 cm, even more preferably 40-60 cm. This distance is preferably measured when the support elements are parallel to each other, preferably horizontally.

There are many possible forms for a meshed support element. For example, a rigid framework may be provided, within which a mesh is woven using a suitable material such as sisal or hemp rope, with openings large enough for the developing fruit to grow through. However, a rigid wire mesh of, for example, metal such as steel or aluminium is preferred. In such a case, a rigid framework is less necessary since the metal mesh itself is rigid and durable. A support element preferably comprises a first plurality of substantially parallel extending first rod-shaped elements, and a second plurality of substantially parallel extending second rod-shaped elements, which first and second rod-shaped elements intersect at an angle and are in contact with each other at the intersections. A "rod-shaped element" is herein understood to be any elongated suitable element, regardless of the shape of its cross-section. A rod-shaped element may be a hollow or solid tube, or a square, rectangular or otherwise shaped profile, such as an L, H, U or V profile. Irregularly shaped rod-shaped elements can also be used, such as those made of natural materials like bamboo. It is also possible to provide a support element with circular or oval mesh shapes. Thus, circular or oval metal elements can be attached to each other to form a horizontal meshed support element.

The mesh size can be chosen according to the size of the intended plant growing on the support element and the size of the fruit the plant produces. For plants with small fruits, such as strawberries, a relatively small mesh size of 5 cm or larger, such as 10 cm, can be chosen. For larger plants, a larger mesh size is advantageous. The mesh size is preferably between 5 and 40 cm, more preferably between 10 and 20 cm. The mesh does not have to be so large to allow a ripe fruit to pass through. After all, in an early phase of development, the fruit will grow downwards and then pass through the mesh. Once under the support element, the fruit matures. The fruit thus hangs under the roots of its own plant, which are located in the unit of nutrient substrate on the respective support element. The skilled person knows which nutrient substrate is suitable and its composition may depend on the crop to be grown. The nutrient substrate is preferably soil, but can also be in the form of a gel. The nutrient substrate should preferably be dimensionally stable.

To provide sufficient light, one or more light sources are preferably placed under a support element and directed towards the top of the support element there below. These light sources thus provide sufficient light for the leaves of the underlying plant. Also, there may be irrigation systems running through the spaces between the support elements, which are arranged to provide moisture and possibly nutrients to the separate units of nutrient substrates in a targeted manner.

The support assembly may comprise one or more units of nutrient substrate, preferably placed on, in or at the support elements. The nutrient substrates may be placed or hung in the meshes of the support element, or may be placed on the meshes. Preferably, the nutrient substrates are form stable. However, it is also possible to place a nutrient substrate in the form of soil in a bag and hang it on the supporting element. Placing topsoil in a pot, such as a plastic plant pot, provides a nutrient substrate that is dimensionally stable for the purpose intended herein and can be placed on or in the meshes. In an attractive embodiment, a unit of form stable nutrient substrate is designed as a compressed element. Preferably, the nutrient substrate has at least locally an outer circumference corresponding to the inner circumference of one or more meshes of a support element. This allows the nutrient substrate to be fitted into the meshes of the support element. By a tapered design, the nutrient substrate can sink into the mesh until the outer circumference of the nutrient substrate matches the inner circumference of the mesh. The support elements may also be provided with holding elements that are designed to hold a unit of nutrient substrate.

The invention also relates to a method for growing a plurality of essentially horizontally growing plants in multiple layers above one another, comprising the steps of
 a: providing a support assembly according to any of the preceding claims,
 b: placing one or more units of nutrient substrate on or attached to one or more mesh-shaped support elements, which units of nutrient substrate extend over a maximum of 20% of the surface of the respective support element,
 c: allowing an essentially horizontally growing plant to be rooted in the unit of nutrient substrate,
 d: allowing the plant to grow essentially horizontally on the meshed support elements,
 e: allowing the essentially horizontally growing plant to form fruits through the meshes of the support element,
 f: allowing the fruit under the meshed support element on which the plant is growing to ripen,
 g: harvesting the fruits.

In step b, only a limited part of the surface of the support element is occupied by one or more units of nutrient substrate, thus providing sufficient space for the developing fruits to grow through the meshes. The units of nutrient substrate are preferably round or rectangular blocks of nutrient substrate in which a plant roots. These blocks may be placed at intersections of the mesh framework of a support element, or the support element may be provided with spaced support surfaces for supporting such nutrient substrate blocks. However, it is also possible to suspend a nutrient substrate, for example in a net or a bag, from a support element, whereby the stems then grow to the top of the support element and then develop horizontally across the support element.

The units of nutrient substrate preferably extend over a maximum of 10% of the surface of the respective support element.

Preferably, the vertical distance between the support elements should be 20-100 cm, with more preference 30-80 cm, with even more preference 40-60 cm.

Preferably, the substantially horizontally growing plants receives light from above from a light source located between the support element above the support element on which the plant grows and the said support element on which the plant grows. Lighting from below is also possible. Such lighting can also be placed or applied together with lighting from above.

Examples of suitable plants are given below. However, it is possible to breed crops in a targeted manner in such a way that they grow horizontally in order to make such crops suitable for the growth method described herein.

Vegetable: Solanaceae Tomato/*Lycopersicum*, Peppers/*Capsicum*, Aubergine/*Solanum* Cucurbitaceae Cucumber-Melon/*Cucumis*, Pumpkin-Courgette/*Cucurbita, Rosaceae* Strawberries/*Fragaria*, Fabaceae Beans/*Phaseolus*, Peas/*Pisum* Tubers; Solanaceae Potato/*Solanum* Helianthaceae Jerusalem Artichoke/*Helianthus* Euphorbiaceae Cassava/*Manihot* Lamiaceae Chinese Artichoke/Stachys Tropaeolaceae Mashua/*Tropaeolum* Nyctaginaceae Mauka/*Mirabilis* Oxalidaceae Oca/Oxalis Yam/*Dioscorea* Basellaceae Ulluco/Ullucus Cucurbitaceae Wild Potato/Thladiantha Asteraceae Yakon/*Polymnia* Convolvulaceae Sweet Potato/*Ipomea* Fruits Grossulariaceae Red Berry/*Ribes* Ericaceae Blue Berry/*Vaccinium* Rosaceae Apple/Malus Pear *Pyrus*/Raspberry/*Rubus* Lauraceae Avocado/*Persea* Sapindaceae Lychee/Litchi Moraceae Jackfruit/*Artocarpus* Anacardiaceae Mango/*Mangifera* Rutaceae Orange/Citrus.

The invention will now be explained in more detail by reference to the following drawings, wherein:

FIGS. 1A-E show various implementations of meshed support elements are shown in a perspective top view;

Figure 5A:
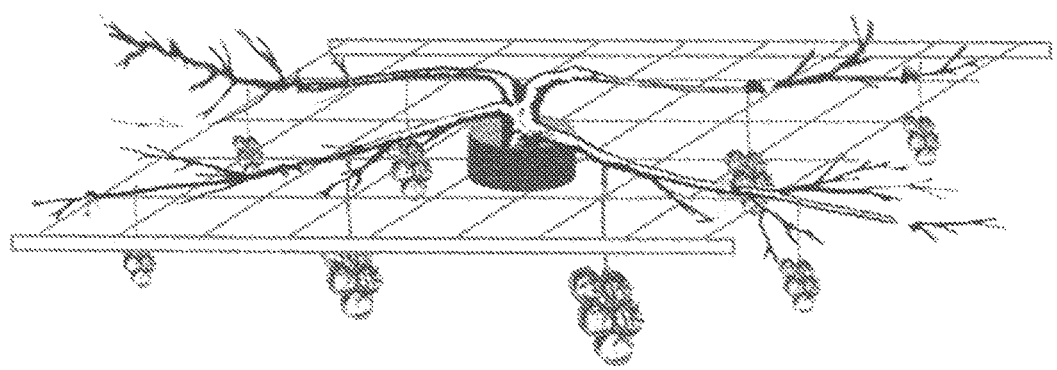
Figure 6A:
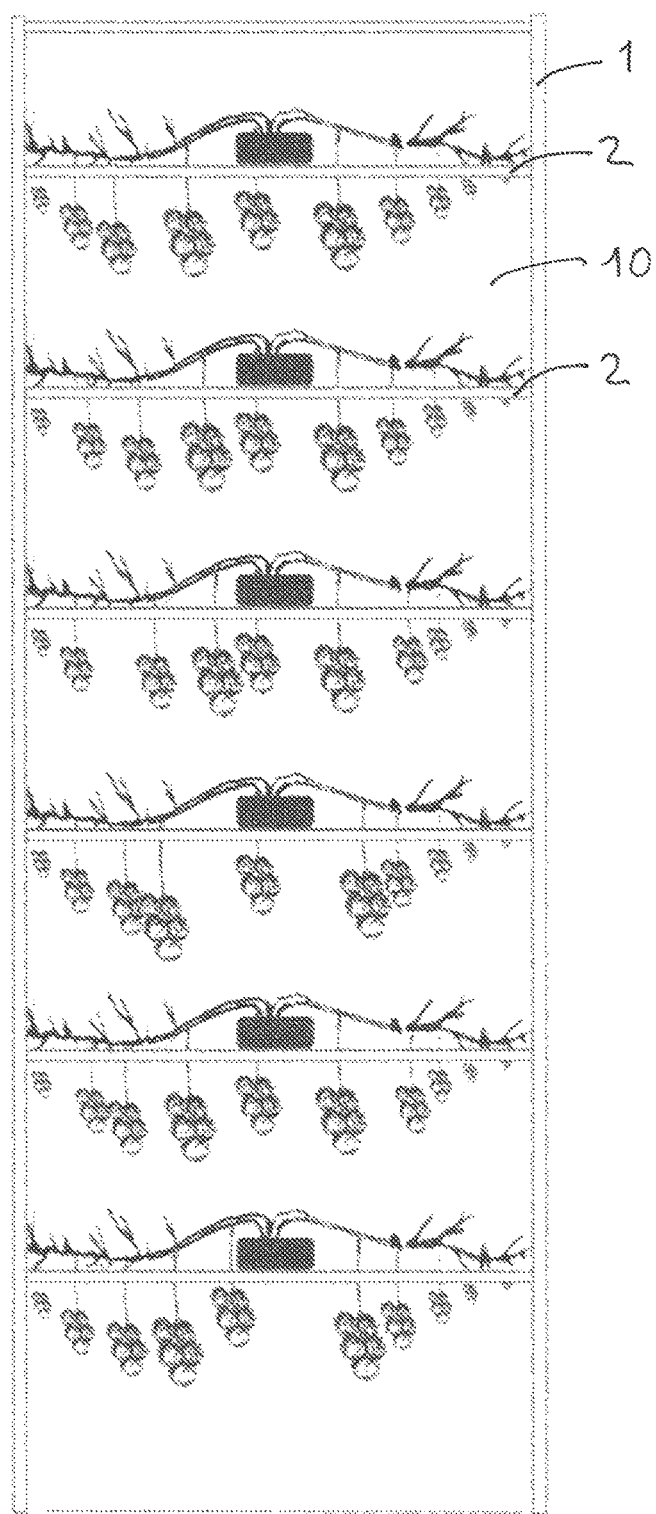
Figure 6B:
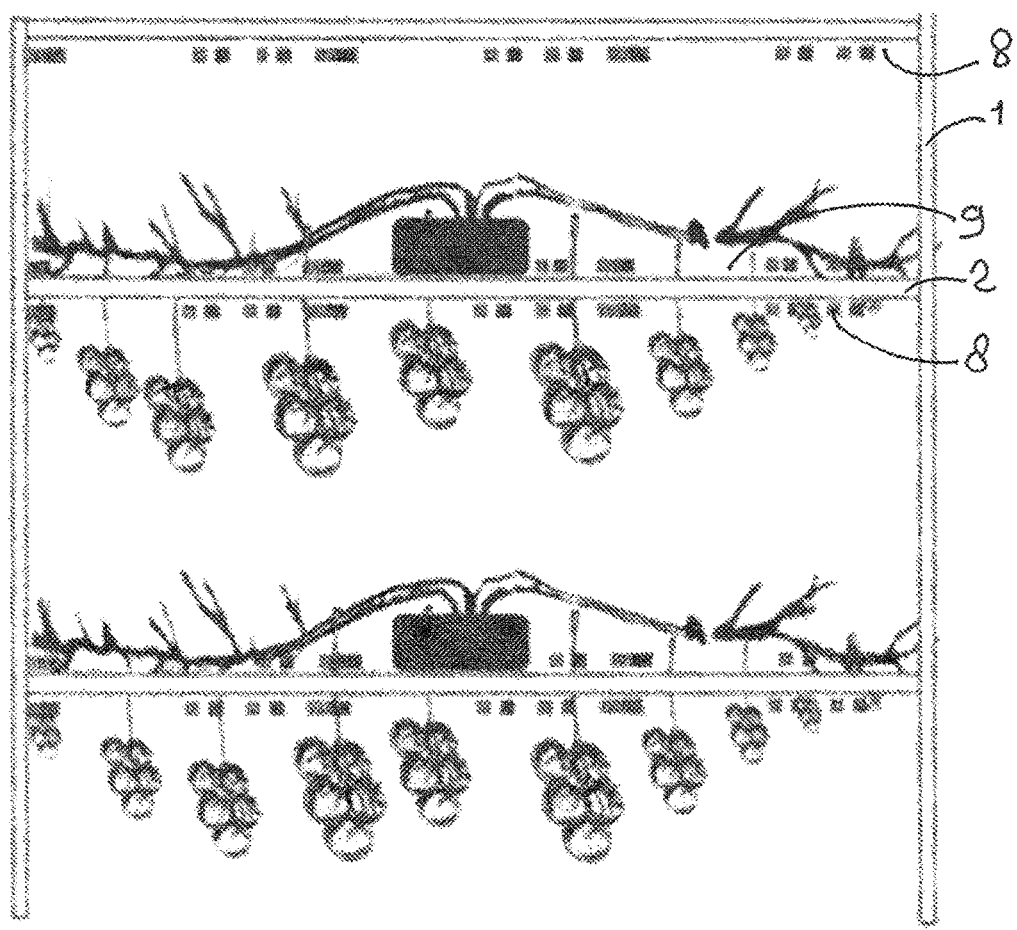
Figure 6C:
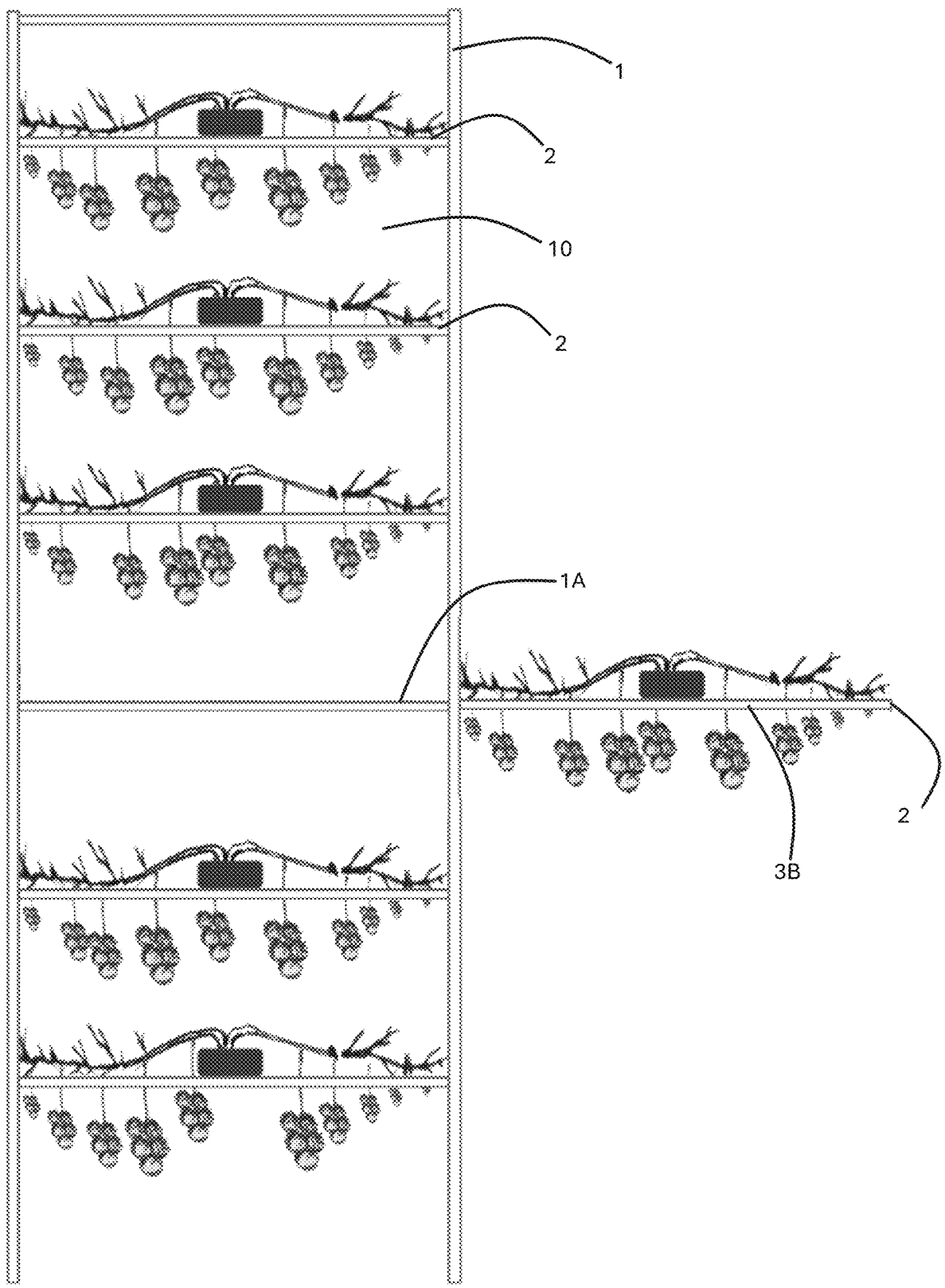

FIGS. 5A, B and C show an upper and lower perspective view and a transversal view of a support element according to FIG. 1 respectively, on which a tomato plant is growing in an essentially horizontal direction;

FIGS. 6A, 6B and 6C show a transversal view of an assembly according to the layout with support elements on each a tomato plant is growing. In FIG. 6B a light source is also present. FIG. 6C shows the support assembly with a frame 1 holding multiple support elements 2, spaced apart creating a growth space 10 therebetween. The support elements can be horizontally moved relative to one another, e.g., by sliding the support ledges 3A and 3B of a support element 2 as shown in FIGS. 1A-C over horizontal guides 1A of the frame 1.

In the figures, components once shown are not necessarily named again. FIG. 1A shows a meshed support element 2, provided with two support ledges 3a and 3b, extending parallel to each other, which are connected to each other by rod-shaped elements 4a, also extending parallel to each other, perpendicular to the support ledges 3a and 3b. Rod-shaped elements 4b extend mainly perpendicular to the rod-shaped elements. The arrowheads indicate that support element 2 may extend further in this direction. At the not shown ends of the support element 2, a support ledge may have been attached connecting both support ledges 3a and 3b, creating a framework that carries the rod-shaped elements 4a and 4b. In this support element, the bar-shaped elements form square meshes 5. In FIG. 1B, the spacing between rod-shaped elements 4a is greater than that between rod-shaped elements 4b, forming rectangular meshes 5. In FIG. 1C, the spacing between rod-shaped elements 4a is smaller than that between rod-shaped elements 4b, which also results in the formation of rectangular meshes 5, but now perpendicular to the direction of the arrow. In FIG. 1D, support ledges 3a and 3b support bar-shaped elements 4a and 4b at an angle to each other, each extending from support ledge 3a to support ledge 3b. This creates meshes 5a, 5b of different shape and size. In FIG. 1E, the rod-shaped elements are circular and interconnected, forming round meshes 5.

Figure 1A:
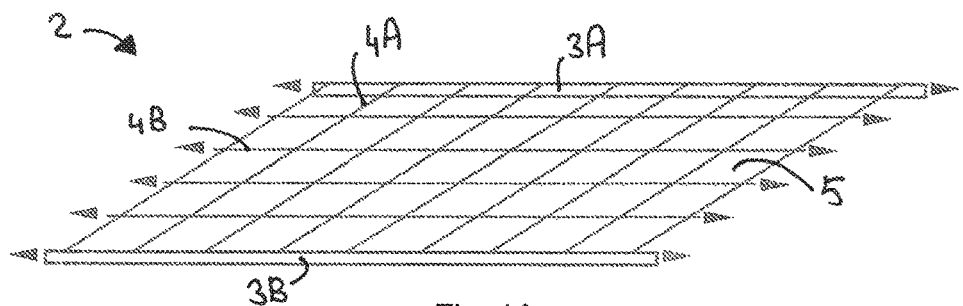
Figure 1B:
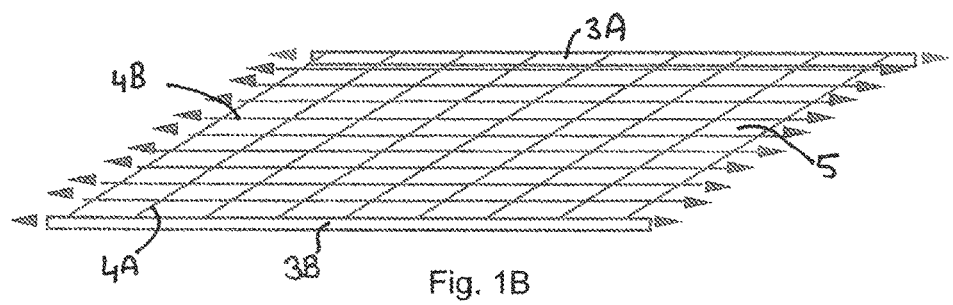
Figure 1C:
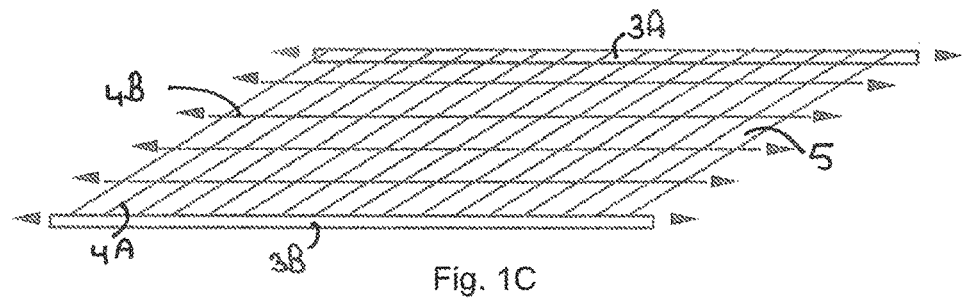
Figure 1D:
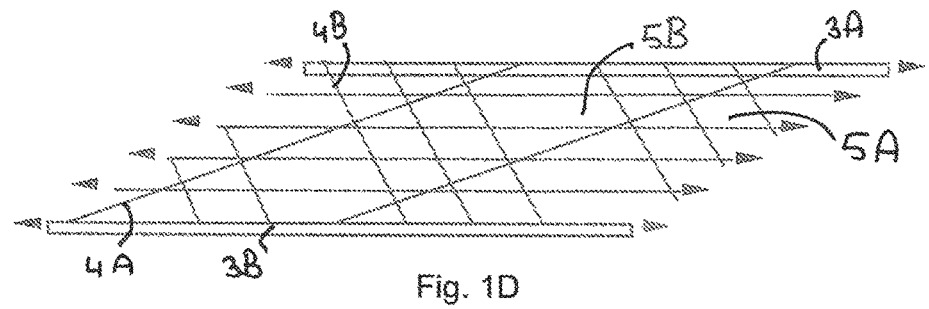
Figure 1E:
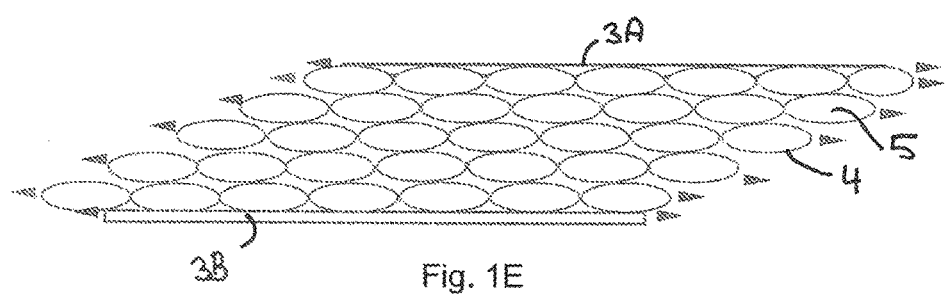
Figure 2A:
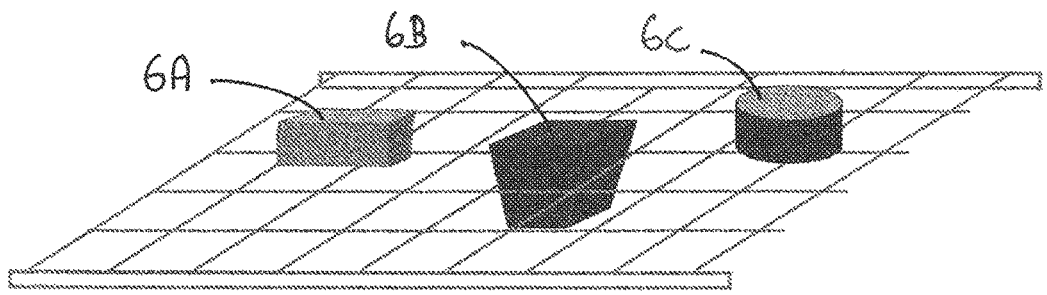
FIGS. 2A and 2B show the support element according to FIG. 1A provided with different units of nutrient substrates, respectively in top and bottom perspective view.
Figure 2B:
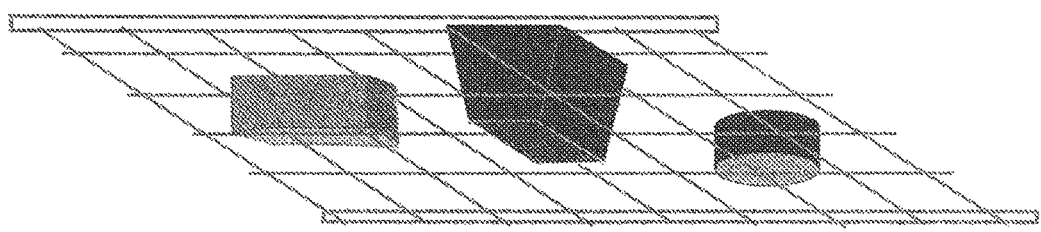
Figure 2C:
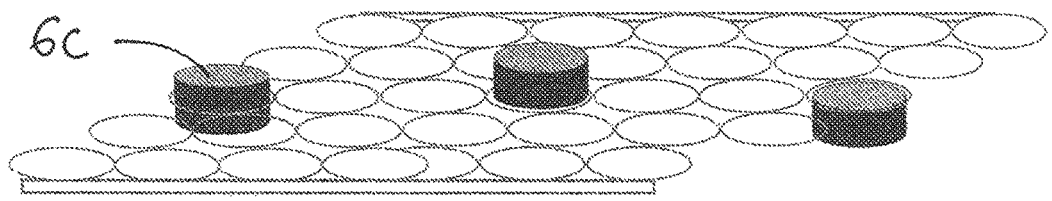
FIG. 2C shows a top perspective view of a support element according to FIG. 1E with matching units of nutrient substrate.

FIGS. 2A and 2B are a perspective top view and bottom view of the support element according to FIG. 1A, respectively, on which units of nutrient substrate 6a-c of different shape are placed. Unit of nutrient substrate 6a is block-shaped and is placed on the mesh formed by the rod-shaped supports. The unit of nutrient substrate 6b has a truncated pyramid shape and is placed in a mesh of the support element, and the unit of nutrient substrate partly sinks through the mesh and is held therein by the support element where the outer circumference of the unit of nutrient substrate corresponds to the inner circumference of the respective mesh. Unit of nutrient substrate 6c is disc-shaped. FIG. 2C shows a support element according to FIG. 1E, wherein which a disc-shaped unit of nutrient substrate fits. Such a unit of nutrient substrate can also be tapered to be held in the now round mesh as shown for feed table 6b. The units of nutrient substrate may also comprise loose potting soil contained in a shaped receptacle. For example, unit of nutrient substrate 6a may comprise a rectangular container filled with potting soil, and unit of nutrient substrate 6b may comprise a truncated pyramid-shaped container tapered downward, also filled with potting soil or any other type of growing soil suitable for growing a target plant.

Figure 3A:
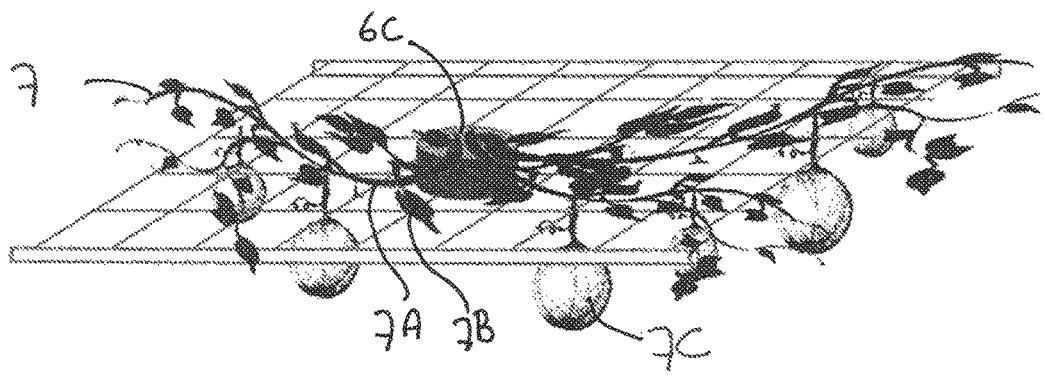
FIGS. 3A and 3B show a top and bottom perspective view of a support element according to FIG. 1 on which a pumpkin plant is growing.
Figure 3B:
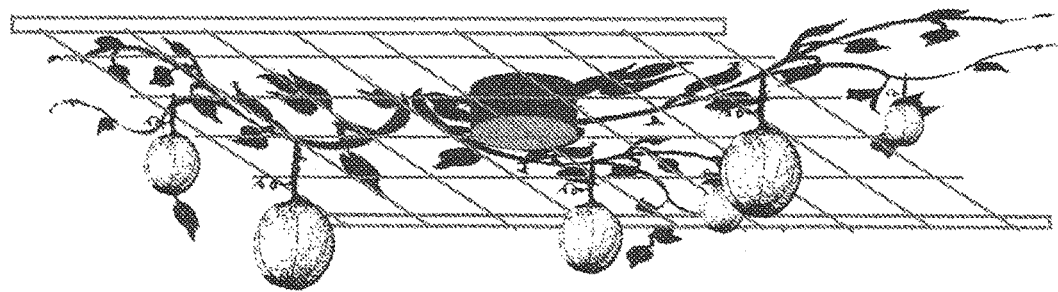

In the top and bottom perspective views of FIGS. 3A and 3B respectively, a pumpkin plant 7 with stem 7a, leaf 7b and pumpkin fruit 7c is growing from a disc-shaped unit of nutrient substrate 6c placed on a support element as shown in FIG. 1a.

Figure 4A:
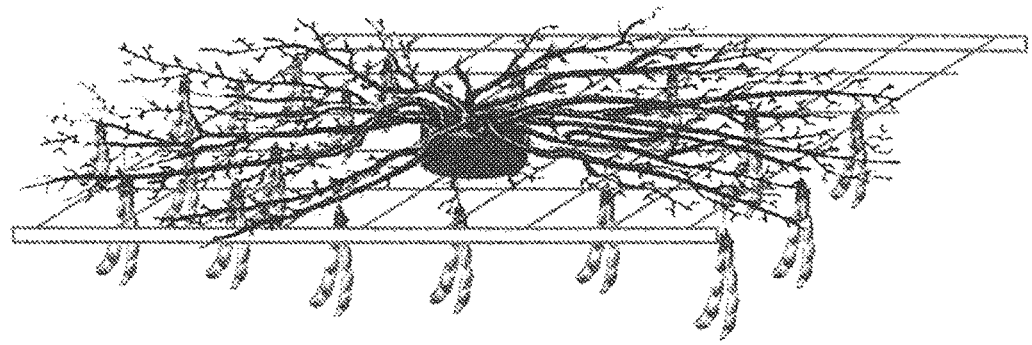
FIGS. 4A and 4B show a top and bottom perspective view of a support element according to FIG. 1 on which a broad bean plant is growing in an essentially horizontal direction.
Figure 4B:
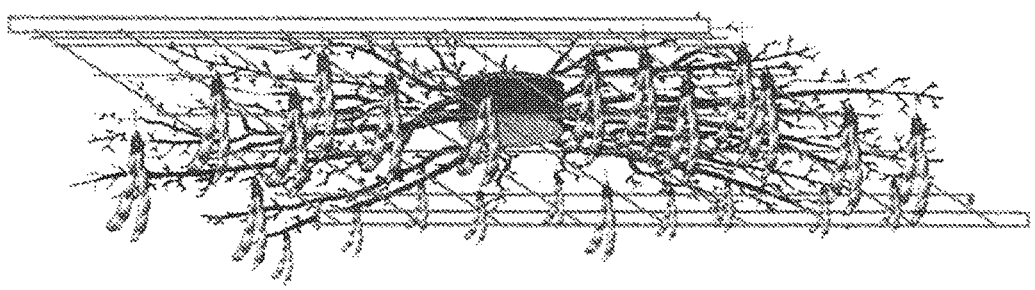
Figure 5B:
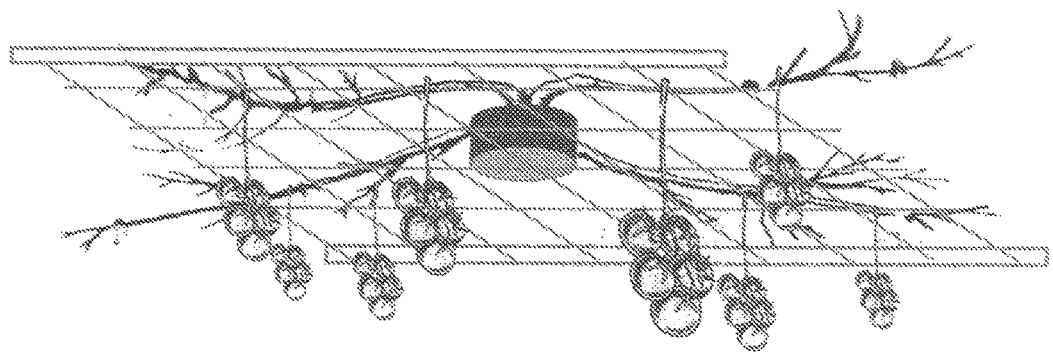
Figure 5C:
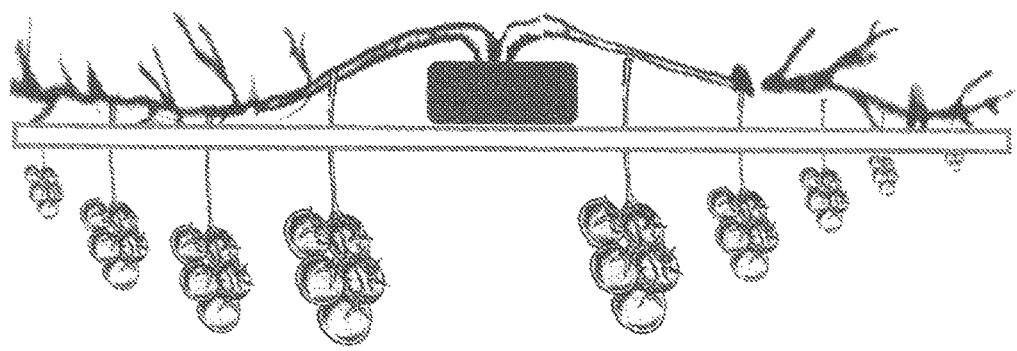

In FIGS. 4A and 4B, a runner bean plant is growing as the pumpkin plant shown in FIG. 3, growing in an essentially horizontal direction, and in FIGS. 5A and 5B, a tomato plant is growing as the pumpkin plant shown in FIG. 3, growing in an essentially horizontal direction. The leaves grow upwards, while the stems are essentially horizontal, partly because of the weight of the fruit borne. FIG. 5C shows a transverse view.

FIG. 6A shows a support assembly according to the invention with a frame 1 holding multiple support elements 2, on which tomato plants grow as shown in FIG. 5 in the illustrated case. The support elements 2 are spaced apart creating a growth space 10. The support elements 2 are mutually movable relative to each other to facilitate easy harvesting of the fruit and maintenance of the assembly, as can be seen in FIG. 6C. This can be done, for example, by designing some of the supporting elements as drawers that can be pulled out of the frame. It is also possible to adjust the height between the support elements so that the height can be changed when needed. FIG. 6B shows top lighting 8, which may be attached to an upper supporting element. An additional lower lighting 9 may be placed on the respective support element. The upper lighting is preferably directed downwards, and the lower lighting upwards. However, it is also possible to combine lightings 8 and 9 to illuminate two adjacent spaces 10 from the bottom and from the top, respectively.

The invention claimed is:

1. A support assembly for supporting a plurality of layers of essentially horizontally growing plants, comprising a plurality of essentially horizontally extending meshed support elements, arranged one above the other with a distance therebetween, wherein each said meshed support element has a mesh with a mesh size, said mesh size being such that fruit forming from the essentially horizontally growing plants can grow downwards through the meshes to ripen under the respective meshed support element, wherein the distance between two meshed support elements arranged one above the other is such that both unhindered horizontal growth of the essentially horizontally growing plants on the lower one of the two meshed support elements and the development and ripening of the fruit of the essentially horizontally growing plants growing on the upper one of the two meshed support element are allowed, and wherein a plurality of the meshed support elements are slidably movable horizontally relative to one another to provide space for harvesting the fruit, wherein one or more meshes of a said meshed support element is designed to support a nutrient substrate unit with an outer circumference shape and size, such that said one or more meshes has a shape and size that corresponds to the outer circumference shape and size of a nutrient substrate unit, such that a nutrient substrate unit can fit into the mesh and be supported thereby.

2. The support assembly according to claim 1, further comprising a common frame carrying the meshed support elements, which frame allows movement of at least a plurality of the meshed support elements relative to one another, both horizontally and vertically.

3. The support assembly according to claim 1, wherein one or more of the meshed support elements are horizontally tiltable.

4. The support assembly according to claim 1, wherein the distance between the meshed support elements is adjustable.

5. The support assembly according to claim 1, wherein the distance between the meshed support elements is 20-100 cm.

6. The support assembly according to claim 1, wherein each said meshed support element comprises a first number of substantially parallel extending first rod-shaped elements, and a second number of substantially parallel extending second rod-shaped elements, which first and second rod-shaped elements cross each other at an angle and are in contact with each other at the intersections.

7. The support assembly according to claim 1, wherein the mesh size of the mesh in each said meshed support elements is between 5 and 40 cm.

8. The support assembly according to claim 1, further including one or more light sources disposed under at least one of the meshed supporting elements and directed towards the top of the meshed supporting element therebelow.

9. The support assembly according to claim 1, further including a plurality of nutrient substrate units being held by said meshed support elements such that each nutrient substrate unit is spaced from one another, wherein said nutrient substrate units fit within and are supported by said mesh.

10. The support assembly according to claim 9, wherein each of said nutrient substrate units is a dimensionally stable growth substrate.

11. The support assembly according to claim 1, wherein one or more meshes of a said meshed support element is designed to support a nutrient substrate unit with an outer circumference shape, such that said one or more meshes has a shape that corresponds to the outer circumference shape of a nutrient substrate unit.

12. A method for improved harvesting of essentially horizontally growing plants, comprising the steps of
   a) providing a support assembly comprising a plurality of essentially horizontally extending meshed support elements, arranged one above the other with a distance therebetween, wherein each said meshed support element has a mesh with a mesh size, said mesh size being such that fruit forming from the essentially horizontally growing plants can grow downwards through the meshes to ripen under the respective meshed support element, wherein the distance between two meshed support elements arranged one above the other is such that both unhindered horizontal growth of the essentially horizontally growing plants on the lower one of the two meshed support elements and the development and ripening of the fruit of the essentially horizontally growing plants growing on the upper one of the two meshed support element are allowed, and wherein a plurality of the meshed support elements are slidably movable horizontally relative to one another to provide space for harvesting the fruit;
   b) placing one or more nutrient substrate units on or attached to one or more of the meshed support elements, wherein each of said nutrient support units comprise or contain nutrient substrate with an essentially horizontally growing plant rooted in each of the nutrient substrate units;
   c) allowing the plant to grow essentially horizontally on the meshed support elements such that fruits growing on the plants extend through the mesh of the meshed support element on which the plant is placed;
   d) harvesting the fruits by sliding out a meshed support element that supports one or more unit substrate units and through which fruits are hanging and removing fruits hanging therefrom.

13. The method according to claim 12, further comprising providing a light source located between the meshed support element above the support element on which the plant grows and the said meshed support element on which the plant grows, such that the substantially horizontally growing plants receive light therefrom.

14. The method according to claim 12, wherein the nutrient substrate units comprise form stable nutrient substrates having at least locally an outer circumference corresponding to the inner circumference of one or more meshes of a meshed support element, such that a nutrient substrate unit fits into the mesh and is supported thereby.

* * * * *